United States Patent
Morinaga

(10) Patent No.: US 7,568,384 B2
(45) Date of Patent: Aug. 4, 2009

(54) SENSOR-INCORPORATED TIRE AND TIRE CONDITION ESTIMATING METHOD

(75) Inventor: Hiroshi Morinaga, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 124 days.

(21) Appl. No.: 10/567,566

(22) PCT Filed: Aug. 19, 2004

(86) PCT No.: PCT/JP2004/011887

§ 371 (c)(1),
(2), (4) Date: Feb. 8, 2006

(87) PCT Pub. No.: WO2005/016670

PCT Pub. Date: Feb. 24, 2005

(65) Prior Publication Data
US 2006/0201240 A1    Sep. 14, 2006

(30) Foreign Application Priority Data
Aug. 19, 2003    (JP)    ............................. 2003-295454

(51) Int. Cl.
G01M 17/02    (2006.01)
(52) U.S. Cl. ........................................................ 73/146
(58) Field of Classification Search ........ 73/146–146.8; 340/440–447
See application file for complete search history.

(56) References Cited

U.S. PATENT DOCUMENTS

| | | | |
|---|---|---|---|
| 5,749,984 A * | 5/1998 | Frey et al. | .................... 152/415 |
| 5,864,056 A | 1/1999 | Bell | |
| 6,666,079 B2 * | 12/2003 | Poulbot et al. | ................. 73/146 |
| 6,921,197 B2 * | 7/2005 | Aubel et al. | ................. 374/141 |
| 7,158,018 B2 * | 1/2007 | Schick | ........................ 340/442 |
| 7,302,868 B2 * | 12/2007 | Shima et al. | ............. 73/862.69 |
| 7,316,251 B2 * | 1/2008 | Kogure et al. | ............ 152/152.1 |
| 2003/0021330 A1 | 1/2003 | Aubel et al. | |

FOREIGN PATENT DOCUMENTS

| | | |
|---|---|---|
| JP | 9-188113 A | 7/1997 |
| JP | 2002-331813 A | 11/2002 |
| JP | 2003-54228 A | 2/2003 |
| JP | 2003-54229 A | 2/2003 |
| JP | 2003-65871 A | 3/2003 |
| JP | 2003-127628 A | 5/2003 |

* cited by examiner

*Primary Examiner*—Andre J. Allen
*Assistant Examiner*—Jermaine Jenkins
(74) *Attorney, Agent, or Firm*—Sughrue Mion, PLLC

(57) ABSTRACT

In order to accurately and stably estimate the conditions of a running tire, a vehicle is equipped with a sensor-incorporating tire having, at an equal distance from the center in the axial direction of the tire, pressure sensors (11A, 11B) buried in a tread rubber positioned on the outer side in the radial direction of the tire belt layer of a tire tread portion and on the inner sides in the radial direction of tread blocks, the contact length $L_A$ of the car body side and the contact length $L_B$ of the opposite side of the center in the axial direction of the tire are detected by using the duration times of pressure values from the pressure sensors (11A, 11B) and a wheel speed from a wheel speed sensor (14), and the ratio $R=L_A/L_B$ of the contact length $L_A$ to the contact length $L_B$ is computed to estimate lateral force generated by the tire, or the average contact length $L_{AB}$ which is the average value of the contact lengths $L_A$ and $L_B$ is computed to determine a load applied to the tire.

14 Claims, 8 Drawing Sheets

DEPENDENT ON SLIP ANGLE

DEPENDENT ON CAMBER ANGLE

SENSOR-INCORPORATED TIRE AND TIRE CONDITION ESTIMATING METHOD

BACKGROUND OF THE INVENTION

1. Field of the Invention

The present invention relates to a sensor-incorporating tire which incorporates sensors in a tire tread portion and to a method of estimating the conditions of a running tire by using this tire.

2. Description of the Prior Art

In order to improve the running stability of an automobile, it is desired that lateral force generated by a tire and a load or a friction coefficient (road friction coefficient μ) between the tire and the road should be estimated accurately and fed back to car control. It is expected that the advanced control of an ABS brake will be possible and safety will be further improved by these data.

As means of estimating force generated in a tire by using the tire like a sensor, there has been proposed a method of estimating lateral force generated in the tire from the detection output of a magnetic sensor by magnetizing a tire side portion, measuring the degree of twist of the tire side portion with the magnetic sensor installed on an exterior portion of the tire and estimating the longitudinal force of the tire from the estimated degree of twist or by making use of the fact that the whole belt ring is deformed when the tire receives lateral force (refer to patent document 1, for example).

Patent document 1: U.S. Pat. No. 5,895,854

SUMMARY OF THE INVENTION

Although the longitudinal force of the tire can be measured accurately in the above method of the prior art, lateral force cannot be measured accurately due to a small gain. When the magnetic force of the magnetized tire side portion becomes weak due to a time change, the estimated value becomes wrong and it is extremely difficult to detect lateral force with a small gain.

It is an object of the present invention which has been made in view of the above problem of the prior art to improve the running safety of a vehicle by estimating the conditions such as lateral force and a load of a running tire accurately and stably.

The inventors of the present invention have conducted intensive studies and have found that the conditions of a tire can be estimated accurately when lateral force and a load are applied to the tire by detecting the contact lengths of the car body side and the outer side of the running tire, paying attention to the fact that when lateral force is generated in the running tire, the car body side and the outer side of the tire tread differ from each other in contact length according to the size of the lateral force. The present invention has been accomplished based on this finding.

Stated more specifically, when lateral force is generated in the tire, the tire which comprises a tread and a belt receives force in its axial direction on the tread portion. Since a tire tread ring deforms at this point, it is known that the contact shape of the tire is such as shown in FIGS. 15(a) and 15(b) that the contact length of one side of the center in the tire axial direction becomes long and that of the other side becomes short. Then, some detection methods have been studied based on the assumption that force applied to the tire can be monitored by detecting the behavior of the tire tread. As a result, when the relationship between the ratio (contact length ratio) of the contact lengths of two points on both sides (car body side and opposite side (outer side)) of the center in the tire axial direction of the tire tread and the size of lateral force was investigated, it was found that the above contact length ratio and lateral force show good correlation. Particularly when these points are existent at an equal distance from the center in the tire axial direction, they show extremely good correlation. Since there is good correlation between the average value of the contact lengths of the above two points and load even when lateral force is generated, a load applied to the tire can be obtained accurately.

Therefore, by detecting the contact lengths of the car body side and the outer side of the running tire by installing sensors in the tire tread portion, force generated by the tire such as lateral force or load can be detected accurately, thereby making it possible to estimate the conditions of the tire accurately.

This relationship remains unchanged near the grip limit of the tire. When the slip angle increases and lateral force becomes close to its upper limit value, the contact length ratio does not become larger than a certain value any longer like lateral force.

According to a first aspect of the present invention, there is provided a sensor-incorporating tire which incorporates sensors for detecting the conditions of a running tire, comprising at least two tire input detection means for detecting an input from the road which acts on a tire tread portion, which are buried in a tread rubber on the outer side in the radial direction of a tire belt layer.

According to a second aspect of the present invention, there is provided a sensor-incorporating tire, wherein two of the tire input detection means are arranged at linearly symmetrical positions which are equally distant in the axial direction from the center in the axial direction of the tire.

According to a third aspect of the present invention, there is provided a sensor-incorporating tire, wherein the tire input detection means are arranged on the inner side in the radial direction of a tread block contact portion.

According to a fourth aspect of the present invention, there is provided a sensor-incorporating tire, wherein the tire input detection means are pressure sensors whose detection direction is a tire radial direction.

According to a fifth aspect of the present invention, there is provided a sensor-incorporating tire, wherein the tire input detection means are pressure sensors whose detection direction is a tire circumferential direction.

According to a sixth aspect of the present invention, there is provided a tire condition estimating method comprising the steps of:

detecting the contact lengths of at least two locations of a tire tread portion by using the sensor-incorporating tire of any one of claims 1 to 5 and wheel speed measuring means; and estimating the conditions of a running tire based on the detected contact lengths.

According to a seventh aspect of the present invention, there is provided a tire condition estimating method, wherein the contact lengths at linearly symmetrical positions which are equally distant in the axial direction from the center in the tire axial direction of the tire tread portion are detected to estimate lateral force generated by the tire from the ratio of the contact lengths.

According to an eighth aspect of the present invention, there is provided a tire condition estimating method, wherein the contact lengths at linearly symmetrical positions which are equally distant in the axial direction from the center in the tire axial direction of the tire tread portion are detected to estimate a load applied to the tire from the average value of the contact lengths.

According to a ninth aspect of the present invention, there is provided a tire condition estimating method, wherein the contact lengths at linearly symmetrical positions which are equally distant in the axial direction from the center in the tire axial direction of the tire tread portion are detected to estimate a load applied to the tire from the average value of the contact lengths, and the lateral force estimated value is corrected by using this load estimated value.

According to a tenth aspect of the present invention, there is provided a tire condition estimating method, wherein the attitude angle of the tire is estimated from the level ratio of the front half to the latter half of ground contact of the tire input detection value and the ratio of the contact lengths at linearly symmetrical positions which are equally distant in the axial direction from the center in the tire axial direction of the tire tread portion.

According to an eleventh aspect of the present invention, there is provided a tire condition estimating method, wherein the attitude angle of the tire is estimated from the level ratio of the front half to the latter half of ground contact of the tire input detection value and the ratio of the contact lengths at linearly symmetrical positions which are equally distant in the axial direction from the center in the tire axial direction of the tire tread portion, and the lateral force estimated value is corrected by using this attitude angle estimated value.

According to a twelfth aspect of the present invention, there is provided a tire condition estimating method, wherein the contact lengths at linearly symmetrical positions which are equally distant in the axial direction from the center in the tire axial direction of the tire tread portion are detected to estimate whether the tire is approaching the grip limit from a change in the ratio of the contact lengths.

According to a thirteenth aspect of the present invention, there is provided a tire condition estimating method, wherein the contact lengths at linearly symmetrical positions which are equally distant in the axial direction from the center in the tire axial direction of the tire tread portion are detected to estimate a friction coefficient between the tire and the road from a change in the ratio of the contact lengths.

According to a fourteenth aspect of the present invention, there is provided a tire condition estimating method, wherein the estimated road friction coefficient is corrected based on a slip ratio computed from the wheel speed of a driving wheel and the wheel speed of a driven wheel.

According to a fifteenth aspect of the present invention, there is provided a tire condition estimating method comprising the steps of:

monitoring the ratio of tire input detection values at linearly symmetrical positions which are equally distant in the axial direction from the center in the tire axial direction of a tire tread portion obtained by using the sensor-incorporating tire of any one of claims 1 to 5; and estimating that the unsymmetrical wear of the tire proceeds when the ratio exceeds a preset threshold value for a predetermined time or longer.

According to the present invention, a sensor-incorporating tire which incorporates at least two tire input detection means for detecting an input from the road which acts on a tire tread portion, which are buried in a tread rubber on the outer side in the radial direction of a tire belt layer is mounted on a vehicle to detect the conditions of a running tire so that the behavior of the tire tread, particularly the difference in contact length in the tire axial direction at the time of running can be detected, thereby making it possible to detect lateral force generated in the tire accurately. Further, the conditions of the running tire such as a load applied to the tire, the attitude angle of the tire and the road friction coefficient can also be estimated accurately from the above contact lengths. By monitoring the ratio of the tire input detection values at linearly symmetrical positions which are equally distant in the axial direction from the center in the tire axial direction of the tire tread portion, it can be estimated that the unsymmetrical wear of the tire proceeds.

By installing two out of the above tire input detection means at linearly symmetrical positions which are equally distant in the axial direction from the center in the tire axial direction of the tire tread portion, the above contact lengths can be measured more accurately. When the above tire input detection means are installed on the inner side in the radial direction of the tread block contact portion, the contact pressure can be measured accurately and the exposure of the sensor portion by the friction of the tire can be eliminated.

The running state of the vehicle can be controlled stably by the feedback of the estimated values of lateral force and a load to car control.

DESCRIPTION OF THE PREFERRED EMBODIMENT

Preferred embodiments of the present invention will be described hereinunder with reference to the accompanying drawings.

Embodiment 1

Figure 1:
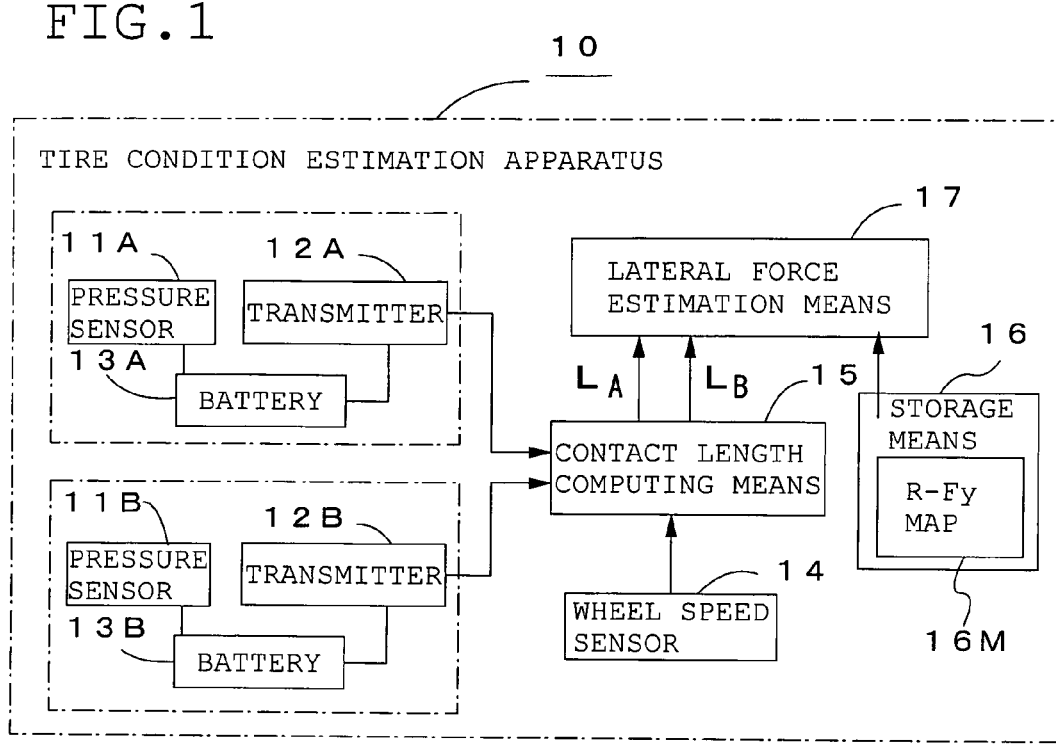
FIG. 1 is a functional block diagram showing the constitution of a tire condition estimation apparatus according to Embodiment 1 of the present invention.
Figure 2:
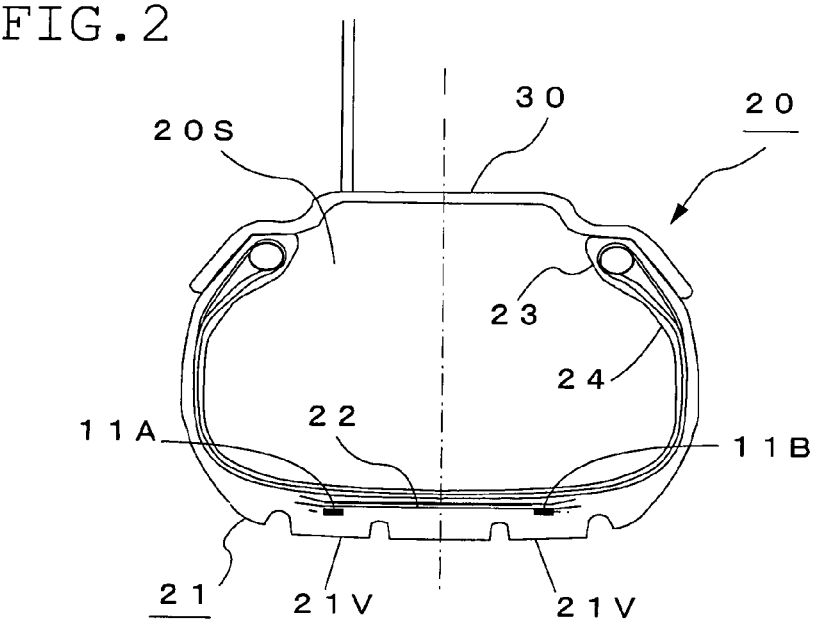
FIG. 2 is a diagram showing a sensor-incorporating tire according to the present invention.

FIG. 1 is a functional block diagram showing the constitution of a tire condition estimation apparatus 10 according to Embodiment 1, and FIG. 2 is a diagram of a sensor-incorporating tire 20 according to the present invention. This tire condition estimation apparatus 10 comprises pressure sensors 11A and 11B as input detection means for detecting that the predetermined position of a tire tread portion 21 contacts the road to produce an input from the road, which are buried in the sensor-incorporating tire 20, transmitters 12A and 12B for transmitting detection data from the above pressure sensors 11A and 11B, batteries 13A and 13B for supplying power to the above pressure sensors 11A and 11b and the above transmitters 12A and 12B, a wheel speed sensor 14 as wheel speed measuring means such as a gear sensor for detecting a wheel speed, contact length computing means 15 for detecting the contact lengths $L_A$ and $L_B$ of positions where the above pressure sensors 11A and 11B are buried by computing a ground contact time and a wheel speed during the turning of the tire 20 based on the output of the wheel speed sensor 14 and the outputs of the pressure sensors 11A and 11B and multiplying the above ground contact time with the wheel speed, and lateral force estimation means 17 for computing the ratio (contact length ratio $R=L_A/L_B$) of the above contact length $L_A$ to the above contact length $L_B$ and estimating lateral force generated by the tire 20 from the computed contact length ratio R using a map 16M showing the relationship between the contact length ratio R and the size of lateral force stored in storage means 16.

The above pressure sensors 11A and 11B are not particularly limited and may be a piezoelectric device or distortion gauge. In this embodiment, pressure sensors whose detection direction is a tire radial direction are used as the above pressure sensors 11A and 11B, and the above pressure sensors 11A and 11b are buried in a tread rubber positioned on the outer side in the radial direction of the tire belt layer 22 of the tire tread portion 21 of the sensor-incorporating tire 20 and on the inner sides in the radial direction of the ground contact portions of tread blocks 21V.

Figure 15A:
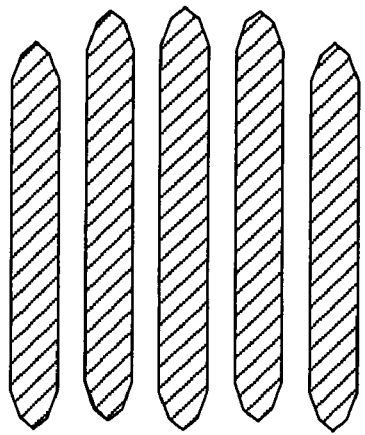
FIGS. 15(A) and 15(B) are diagrams showing the ground contact shape of the tire tread.
Figure 15B:
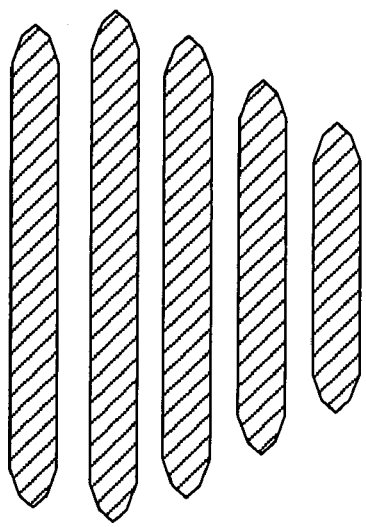

When lateral force is generated in the tire 20, the ground contact shape of the tire 20 becomes such as shown in FIGS. 15(A) and 15(B) that the contact length of one side of the center in the axial direction of the tire becomes long and that of the other side becomes short. Therefore, the pressure sensors 11A and 11B are preferably positioned on the car body side and the opposite side of the center in the axial direction of the tire. In this embodiment, as shown in FIG. 2, the above pressure sensors 11A and 11B are arranged on the inner sides in the radial direction of two second blocks at linearly symmetrical positions which are equally distant in the axial direction from the center in the axial direction of the tire.

Small-sized power generators may be used in place of the batteries 13A and 13B to drive the pressure sensors 11A and 11B and the transmitters 12A and 12B. Further, when a receiver circuit is provided so that power can be wirelessly supplied from the outside to drive the pressure sensors 11A and 11B and the transmitters 12A and 12B, the above batteries 13A and 13B can be omitted.

A description is subsequently given of the method of estimating lateral force generated in the tire with the above tire condition estimation apparatus 10.

When the ground contact portions of tread blocks 21V corresponding to positions where the above pressure sensors 11A and 11b are buried contact the ground, as tire radial-direction pressure is applied to the above pressure sensors 11A and 11B, an output signal corresponding to the above pressure value is output from the above pressure sensors 11A and 11B. The above pressure signals are supplied to the contact length computing means 15 from the transmitters 12A and 12B. Meanwhile, a wheel speed is supplied to the above contact length computing means 15 from the wheel speed sensor 14.

The contact length computing means 15 measures the duration times of the above output signals and multiplies the above duration time's with the wheel speed to compute the contact length $L_A$ and the contact length $L_B$ of the tread blocks 21V corresponding to the positions where the above pressure sensors 11A and 1B are buried. The lateral force estimation means 17 computes the contact length ratio $R=L_A/L_B$ from the above contact length $L_A$ and the contact length $L_B$ to estimate lateral force generated in the tire 20 from the computed contact length ratio R using a map 16M showing the relationship between the contact length ratio R and the size of lateral force stored in storage means 16.

Figure 3:
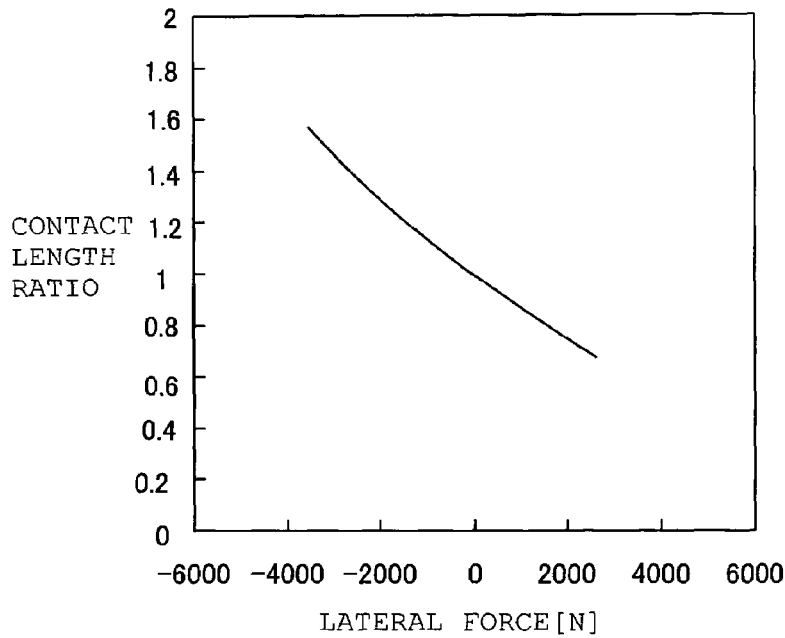
FIG. 3 is a graph showing the relationship between lateral force and contact length ratio.

Since the above pressure sensors 11A and 11B are arranged at an equal distance from the center in the axial direction of the tire as shown in FIG. 2 in this embodiment, as shown in FIG. 3, the above computed contact length ratio $R=L_A/L_B$ and the size of lateral force have a highly linear relationship and are highly correlated with each other. Therefore, when lateral force generated in the tire 20 is estimated by using the map 16M prepared based on the data shown in FIG. 3 and the above contact length ratio R, lateral force can be estimated very accurately.

According to this Embodiment 1, the sensor-incorporating tire 20 comprising the pressure sensors 11A and 11B whose detection direction is a tire radical direction and which are buried at an equal distance from the center in the axial direction of the tire in the tread rubber positioned on the outer side in the radial direction of the tire belt layer 22 of the tire tread portion 21 and on the inner sides in the radial direction of the ground contact portions of the tread blocks 21V is mounted on the vehicle, the contact length $L_A$ of the car body side and the contact length $L_B$ of the other side of the center in the tire axial direction of the above tire 20 are computed from the duration times of pressure values from the above pressure sensors 11A and 11B and the wheel speed from the wheel speed sensor 14 by the contact length computing means 15, the contact length ratio $R=L_A/L_B$ is computed by the lateral force estimation means 17, and lateral force generated in the tire 20 is estimated by using the map 16M showing the relationship between contact length ratio R and lateral force. Therefore, lateral force can be estimated accurately.

Embodiment 2

Figure 4:
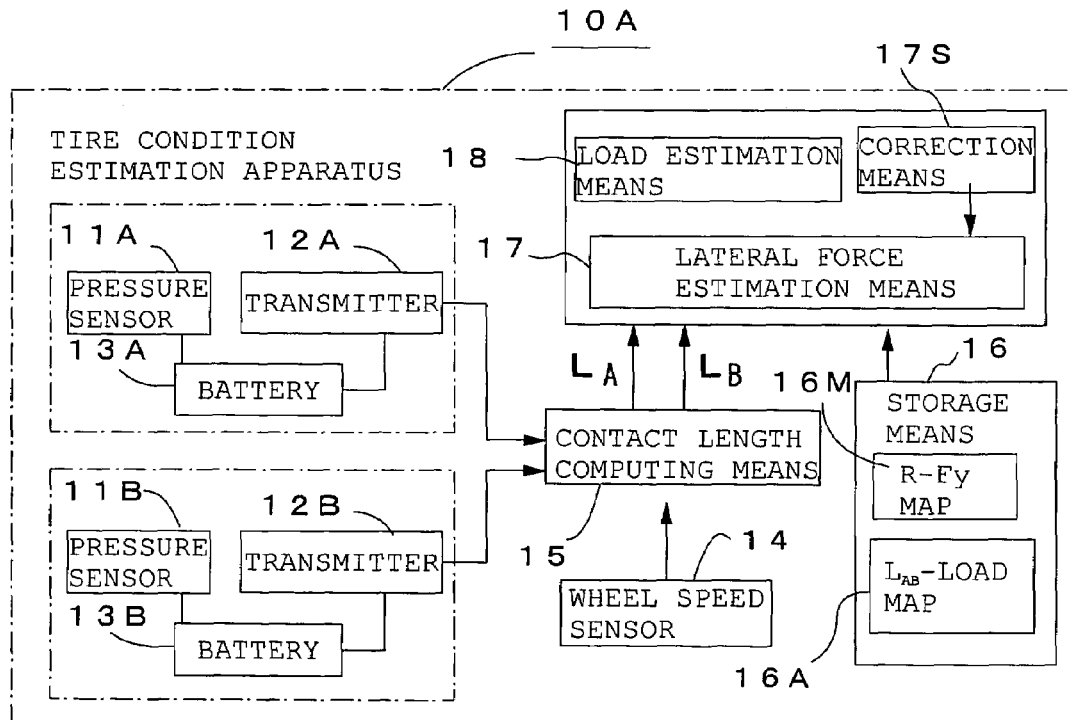
FIG. 4 is a functional block diagram showing the constitution of a tire condition estimation apparatus according to Embodiment 2.

In the above Embodiment 1, the contact length ratio $R=L_A/L_B$ which is the ratio of the contact length $L_A$ of the car body side to the contact length $L_B$ of the opposite side of the center in the tire axial direction of the sensor-incorporating tire 20 is computed to estimate lateral force. As shown in FIG. 4, when load estimation means 18 is provided to compute the average contact length $L_{AB}$ which is the average value of the above contact length $L_A$ and the contact length $L_B$, and a load applied to the above tire 20 is estimated from this average contact length $L_{AB}$, a tire condition estimation apparatus 10A which can estimate lateral force and a load can be constructed.

When lateral force is generated in the tire 20, the ground contact shape of the tire 20 becomes such as shown in FIGS. 15(A) and 15(B) that the contact length of one side of the center in the tire axial direction becomes long and that of the other side becomes short. Therefore, when a load is estimated from the contact length of one point, it is affected by lateral force. That is, even when the same load is applied, the contact length of one side becomes long and that of the other side becomes short at the time of the input of lateral force. However, the average contact length $L_{AB}$ and load have a highly linear relationship and are highly correlated with each other as shown in FIG. 5 even during the generation of lateral force.

Figure 5:
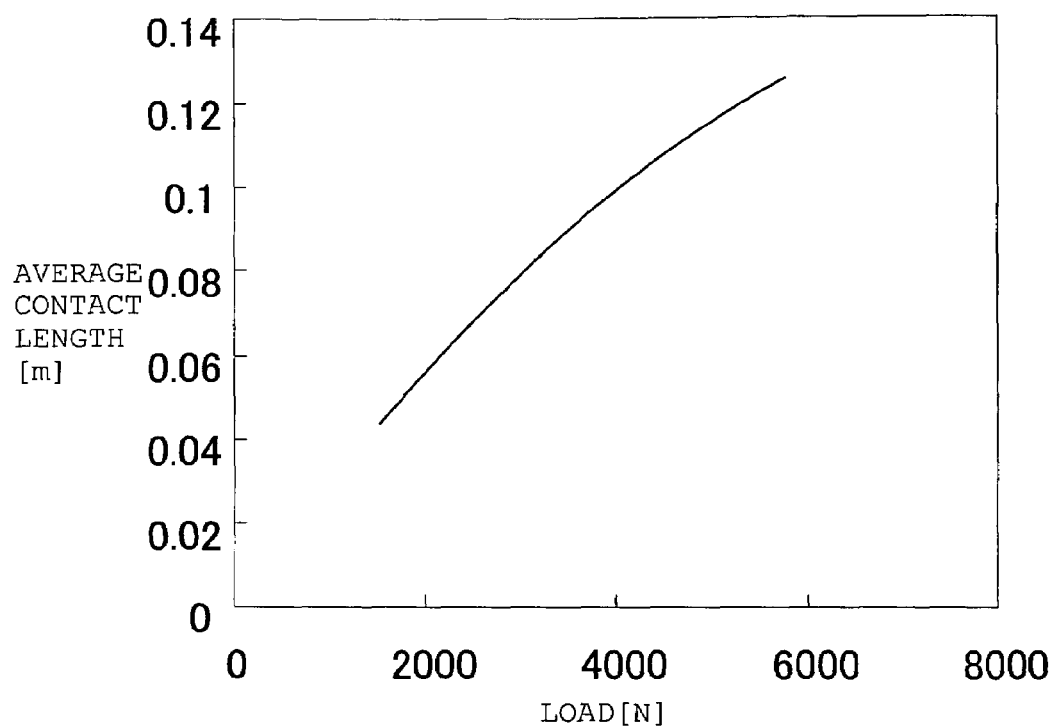
FIG. 5 is a graph showing the relationship between load and average contact length.

Then, in this embodiment, the average contact length $L_{AB}$ which is the average value of the contact length $L_A$ of the car body side and the contact length $L_B$ of the opposite side of the center in the tire axial direction obtained by the above contact length computing means 15 is computed by the load estimation means 18, and a load applied to the tire is obtained from a map 16A showing the relationship between the average contact length and load, which has been prepared based on the computed average contact length $L_{AB}$ and the data of FIG. 5 and is stored in the storage means 16. Thereby, even when lateral force is generated, a load applied to the tire can be obtained accurately.

Since a change in the load applied to the above tire is a parameter generated in a shorter time, by estimating the allotment of a load to the four wheels, the drive force of the wheel is controlled to enable the proper control of the car attitude, thereby making it possible to improve the running stability of the vehicle.

Since the above lateral force is changed by a load applied to the tire, lateral force correction means 17S is provided to correct the lateral force estimated by the above lateral force estimation means 17 based on the estimated load, thereby making it possible to further improve the estimation accuracy of lateral force.

Figure 6:
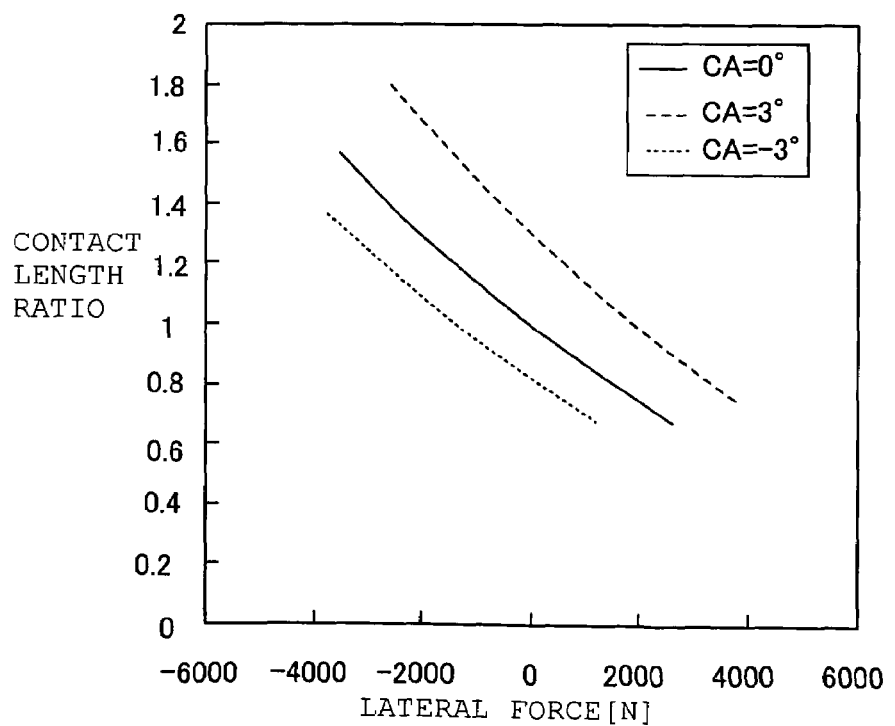
FIG. 6 is a graph showing the relationship between lateral force and contact length ratio when the camber angle is changed.

The relationship between the above contact length ratio R and lateral force is also changed by the attitude angle (camber angle) which is the angle of the tire from the road as shown in FIG. 6. That is, although the contact length ratio and lateral force show good correlation at each camber angle, when the camber angle changes, the relationship between the contact length ratio and lateral force shifts. For example, when lateral force is nil and the camber angle is 0°, the contact length ratio becomes 1. When the camber angle is +3°, the contact length ratio becomes about 1.3. That is, even in the case of the same ground contact shape, the degree of twist of the tire based on the slip angle differs from that based on the camber angle, whereby the generated lateral force differs between them.

Figure 7:
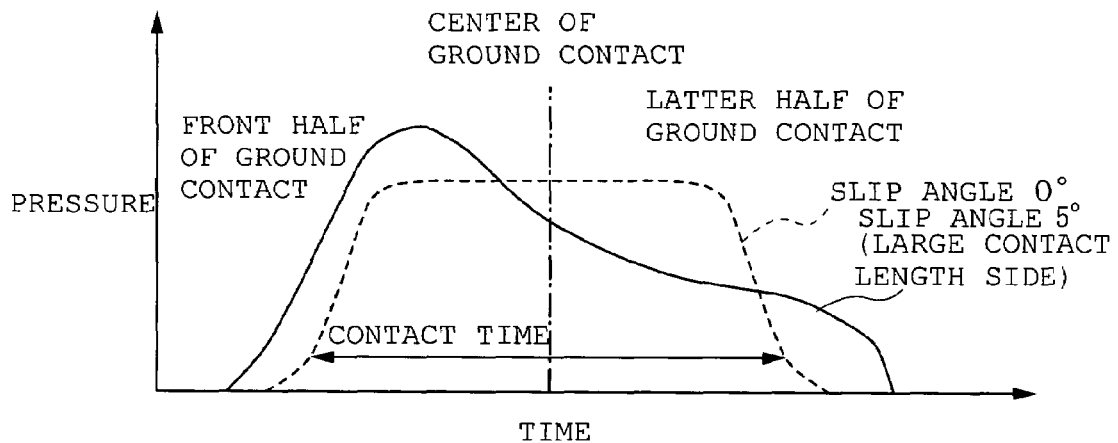
FIG. 7 is a graph showing a time change in contact pressure when the slip angle is changed.
Figure 8:
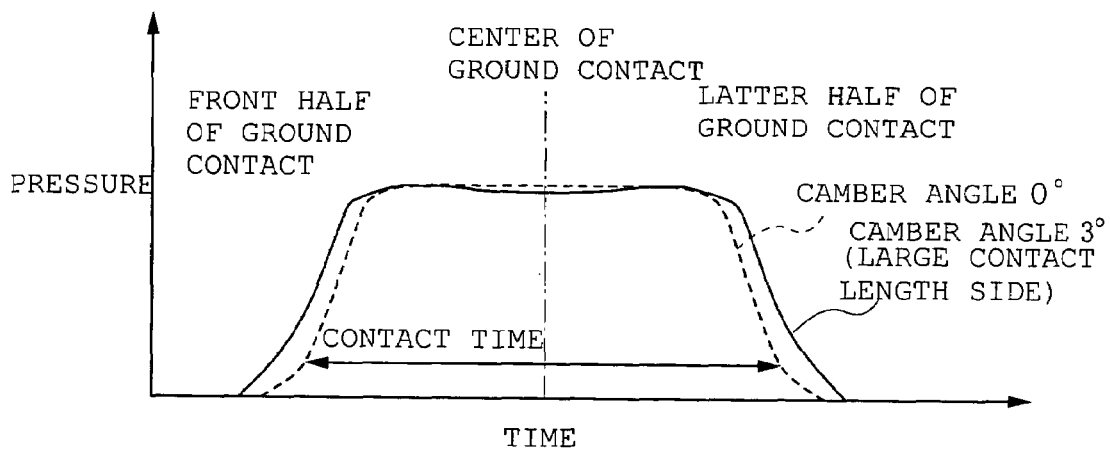
FIG. 8 is a graph showing a time change in contact pressure when the camber angle is changed.
Figure 9:
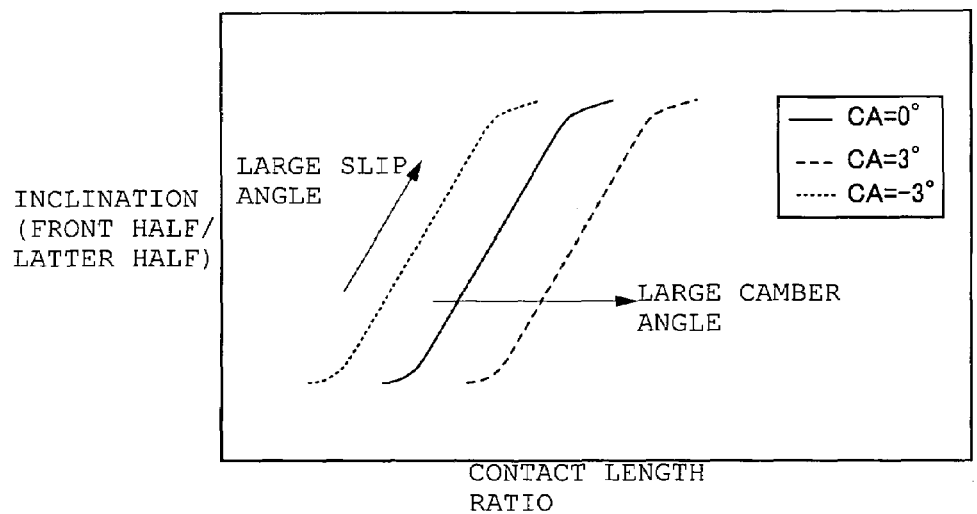
FIG. 9 is a graph showing the relationship between contact length ratio and the ratio of contact pressure on the tread side to contact pressure on the kick side.

However, taking a look at a time change in contact pressure, that is, a time change in the pressure detection value $P_A$ or the pressure detection value $P_B$ of the above pressure sensor 11A or 11B, as shown in FIG. 7, when the slip angle is large, the contact pressure of a side having a large contact length is large on the front half (tread side) of ground contact and small on the latter half (kick side) of ground contact. When the camber angle is large, as shown in FIG. 8, the contact pressure of the front half is almost the same as that of the latter half. Then, when the contact pressure ratio which is the ratio of the contact pressure of the front half to the contact pressure of the latter half is computed and a graph showing the relationship between the contact length ratio R and the above contact pressure ratio is drawn, as shown in FIG. 9, graphs in which the camber angle is changed are obtained by moving the graph for the camber angle of 0° almost in the horizontal direction. That is, in the graph, when the camber angle increases from a certain point of time, the graph moves in the right direction and when the slip angle increases, the graph moves in the upper right direction. Therefore, the camber angle and the slip angle can be estimated from the contact length ratio R and the contact pressure ratio by using this graph.

When lateral force obtained from the contact length ratio R is corrected by using this estimated camber angle, lateral force generated in the tire 20 can be estimated accurately.

Further, since the inclination of the road can be estimated in addition to the camber angles of the wheels when the camber angles of the four wheels are known, when this is applied to the attitude control of the vehicle, the running stability of the vehicle can be improved.

Embodiment 3

Figure 10:
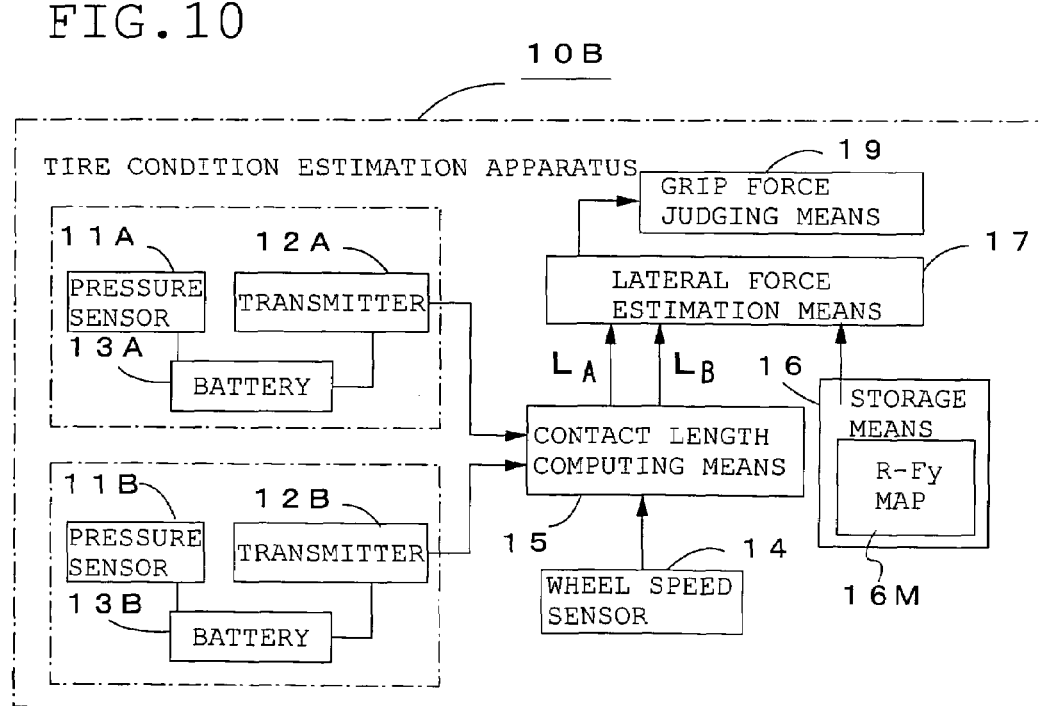
FIG. 10 is a functional block showing the constitution of a tire condition estimation apparatus according to Embodiment 3.

In Embodiments 1 and 2, the tire condition estimation apparatuses 10 and 10A for estimating lateral force and a load by computing the contact length ratio $R=L_A/L_B$ and the average contact length $L_{AB}$ from the duration times of the pressure values from the pressure sensors 11A and 11B and the wheel speed from the wheel speed sensor 14 have been described. As shown in FIG. 10, grip force judging means 19 is provided in the above tire condition estimation apparatus 10 to estimate whether the tire is approaching the grip limit from a change in the contact length ratio $R=L_A/L_B$ computed by the lateral force estimation means 17.

Judging that lateral force is approaching its maximum, that is, the tire grip limit, is useful for vehicle control or as a warning to a driver. Since the contact length ratio $R=L_A/L_B$ is monitored in the present invention, the grip force judging means 19 judges that the tire is approaching the grip limit when a change in the above contact length ratio $R=L_A/L_B$ exceeds a preset threshold value, and suitable vehicle attitude control is carried out based on the result of this decision or a device for issuing a warning signal to the driver is constructed separately to warn the driver, thereby making it possible to ensure the running safety of the vehicle.

As for the above decision, by detecting the steering angle or the car speed at the same time, it may be judged that the tire is approaching the grip limit when the contact length ratio $R=L_A/L_B$ does not increase any longer in spite of an increase in one of these values.

When it is judged that the tire is approaching the grip limit by monitoring a change in the above contact length ratio $R=L_A/L_B$, if the contact length ratio R is smaller than a predetermined value, it is considered that the limit grip force is small and therefore the friction coefficient between the tire and the road is low. Then, the road friction coefficient can be estimated by obtaining critical contact length ratios for various roads which differ in road friction coefficient in advance. Since this road friction coefficient information is useful for the control of an ABS brake or the car body, the running stability of the vehicle can be further improved by the feedback of a road friction coefficient estimated from a change in the above contact length ratio R. The road friction coefficient may be judged by making use of a phenomenon that a change in the contact length ratio R by the steering angle is small, that is, a change in lateral force is small on a road having a low friction coefficient.

It is known that the tire follows the rule of a friction circle. That is, as the longitudinal slip ratio rises, the slip area of the tire tread increases and the critical lateral force drops. Since the critical value of the contact length ratio $R=L_A/L_B$ becomes small thereby, it is preferred that the slip ratio should be computed from the wheel speed of the driving wheel and the wheel speed of the driven wheel and that the estimated road friction coefficient should be corrected based on this computed slip ratio.

Since the pressure detection value $P_A$ and the pressure detection value $P_B$ obtained by the above pressure sensors 11A and 11B differ from each other in the process of the unsymmetrical wear of the tire, the ratio $S=P_A/P_B$ of the above pressure detection value $P_A$ to the pressure detection value $P_B$ is monitored so that it can be estimated that the unsymmetrical wear of the tire proceeds when the above S exceeds a preset threshold value for a predetermined time or longer. Therefore, when it is estimated that unsymmetrical wear proceeds, a device for issuing a warning signal to the driver is constructed to warn the driver, thereby making it possible to urge maintenance and prevent an accident caused by a reduction in vehicle maneuverability.

In the above Embodiments 1 to 3, the pressure sensors 11A and 11B are arranged at linearly symmetrical positions which are equally distant in the axial direction from the center in the axial direction on the inner sides in the radial direction of the two second blocks out of the tread blocks 21V of the tire tread portion 21. The present invention is not limited to this and the installation positions of the pressure sensors 11A and 11B are suitably determined according to the width or the block shape of the tire, for example, the blocks of the shoulder portion. The pressure sensors 11A and 11B are preferably buried in the tread rubber between the tire belt layer 22 which is a rigid body and the road. In order to prevent the exposure of the sensor portions by friction, they are more preferably installed at positions as close to the tire belt layer 22 as possible.

The number of the pressure sensors is not limited to two. For instance, a total of four sensors may be installed at two locations in the circumferential direction, thereby improving accuracy and response.

In the above embodiments, the pressure sensors whose detection direction is a tire radial direction are used. Even when pressure sensors whose detection direction is a tire circumferential direction are used, the same effect can be obtained. That is, although the pressure sensors for detecting the contact length are used in the present invention, since circumferential-direction shear force is generated in the ground contact portion as is well known, even when the detection direction of the pressure sensors is a circumferential direction, outputs based on the ground contact conditions are obtained. Therefore, the high-accuracy detection of the contact length is made possible by suitable waveform processing. Since the contact pressure ratio of the front half to the latter half of ground contact or the output ratio of the two pressure sensors in the process of unsymmetrical wear shows the same tendency as that obtained when the detection direction is the circumferential direction, as far as the map for the circumferential direction is properly drawn, the same estimation as that of the present invention when the detection direction is the radial direction is possible.

EXAMPLES

A sensor-incorporating tire having a size of 185/70R14 shown in FIG. 2 was used to measure lateral force and the contact length by changing the slip angle on a flat belt tester. The inner pressure of the tire was 200 kPa, the load was 4 kN, the running speed was 30 km/hr, and the contact length ratio was measured by pressure sensors at the second block portions.

Figure 11:
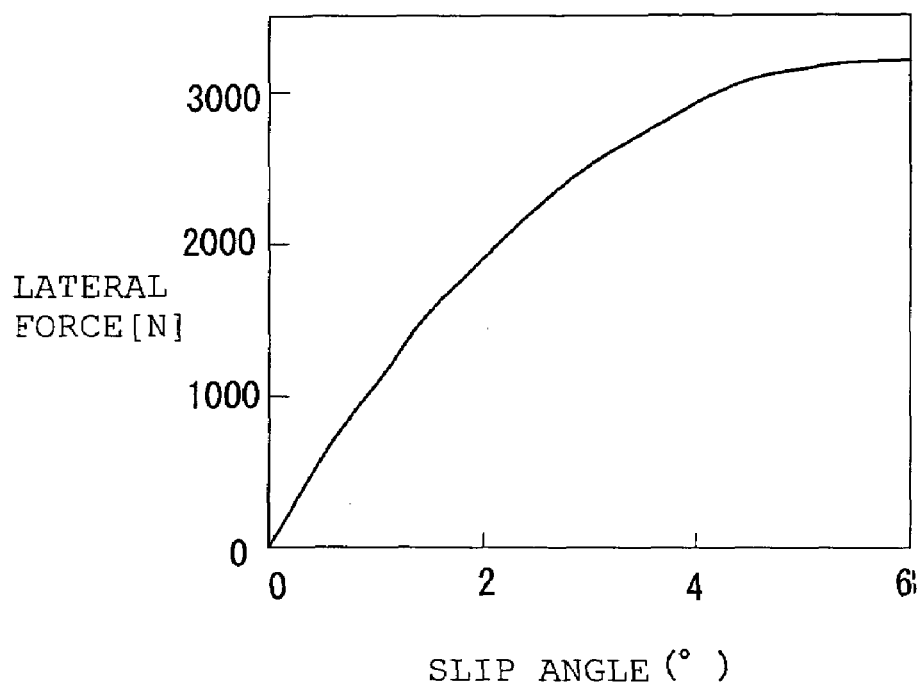
FIG. 11 is a graph showing the relationship between slip angle and lateral force.
Figure 12:
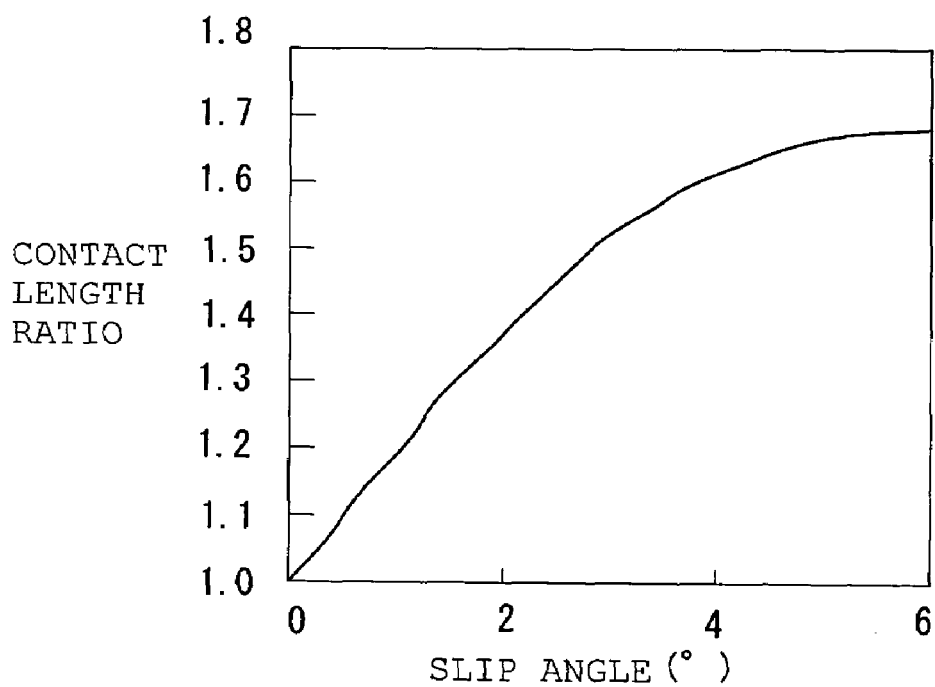
FIG. 12 is a graph showing the relationship between slip angle and contact length ratio.
Figure 13:
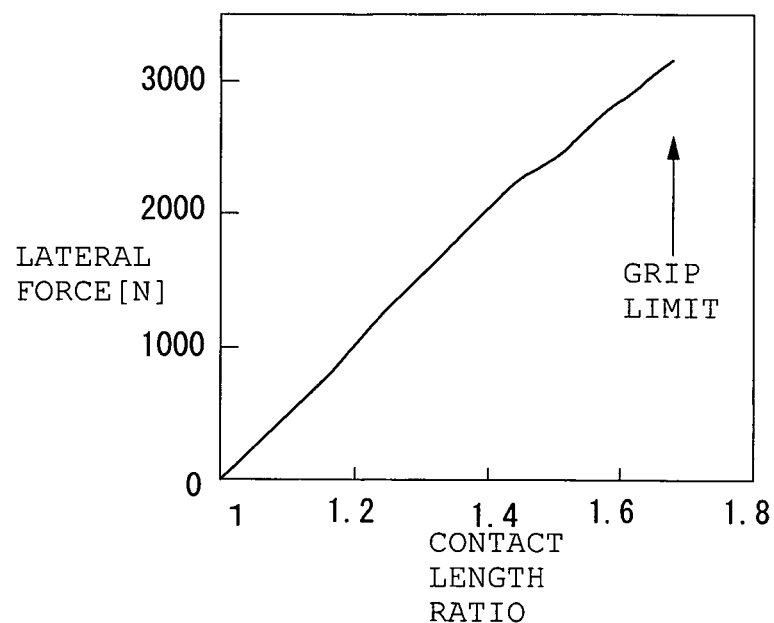
FIG. 13 is a graph showing the relationship between contact length ratio and lateral force.

FIG. 11 and FIG. 12 show the relationship between lateral force and slip angle and the relationship between contact length ratio and slip angle, respectively. When a graph plotting the contact length ratio on the horizontal axis and lateral force on the vertical axis is drawn as shown in FIG. 13, the contact length ratio and the lateral force have linear correlation up to a position close to the grip limit.

When the speed and the tire size were changed, the same results were obtained.

Thereby, it was confirmed that lateral force generated in the tire can be estimated very accurately by detecting the contact lengths at linearly symmetrical positions which are equally distant in the axial direction from the center in the tire axial direction of the tire tread portion to obtain the above contact length ratio.

Figure 14:
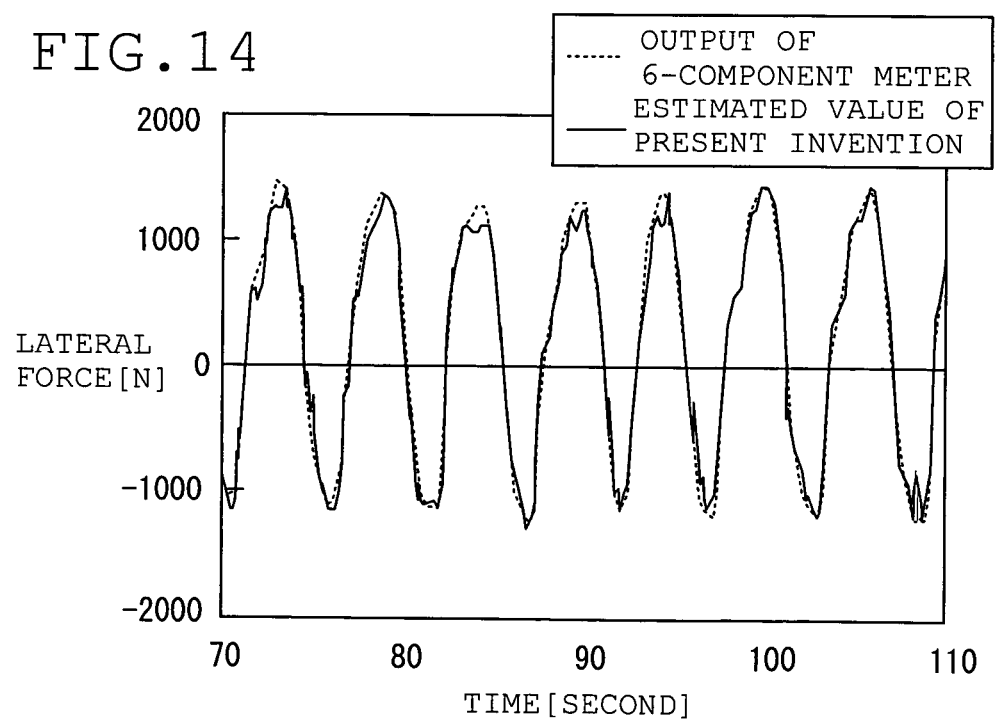
FIG. 14 is a diagram showing the time-series waveforms of the output of a wheel six-component meter and the estimated value of lateral force at the time of slalom driving.

The same tire was attached to a commercially available wheel 6-component meter and further this tire wheel was mounted as the left front wheel of a passenger car to compare the load estimated value and the lateral estimated value obtained from the outputs of the tire with the output value of the wheel 6-component meter. As for driving, a slalom test and a turning test were conducted. FIG. 14 is a graph showing the time-series waveforms of the output of the wheel 6-component meter and the lateral force estimated value at the time of slalom driving, in which the solid line shows the time-series waveform of the lateral force estimated value and the broken line shows the time-series waveform of the output of the wheel 6-component meter. As obvious from the graph, it is understood that the waveform of the lateral force estimated value and the waveform of the output value of the wheel 6-component meter are almost the same. It was confirmed that the load estimated value at the time of slalom driving and the lateral force estimated value and the load estimated value at the time of turning show close correlation with the output value of the wheel 6-component meter.

In other words, even when the sensor-incorporating tire is mounted on the actual vehicle which changes the tire attitude angle, it is made clear that the present invention is effective.

INDUSTRIAL FEASIBILITY

As having been described above, according to the present invention, by using a sensor-incorporating tire provided with tire input detection means for detecting the inputs of at least two locations in the cross direction of the tire tread to enable the detection of the above contact lengths, the conditions of the tire such as lateral force generated by the tire, a load applied to the tire and the unsymmetrical wear of the tire and the friction coefficient between the tire and the road can be estimated accurately. Therefore, the running stability of the vehicle can be greatly improved by the feedback of the above information to vehicle control.

What is claimed is:

1. A sensor-incorporating tire which incorporates sensors for detecting the conditions of a running tire, comprising:
   at least two tire input detection means for detecting an input from the road which acts on a tire tread portion, which are buried in a tread rubber on the outer side in the radial direction of a tire belt layer;
   wherein two of the tire input detection means are arranged at linearly symmetrical positions which are equally distant in the axial direction from the center in the axial direction of the tire.

2. The sensor-incorporating tire according to claim 1, wherein the tire input detection means are arranged on the inner side in the radial direction of a tread block contact portion.

3. The sensor-incorporating tire according to claim 1, wherein the tire input detection means are pressure sensors whose detection direction is a tire radial direction.

4. The sensor-incorporating tire according to claim 1, wherein the tire input detection means are pressure sensors whose detection direction is a tire circumferential direction.

5. A tire condition estimating method comprising the steps of:
   detecting the contact lengths of at least two locations of a tire tread portion by using
      wheel speed measuring means, and
      a sensor-incorporating tire comprising at least two tire input detection means for detecting an input from the road which acts on a tire tread portion, which are buried in a tread rubber on the outer side in the radial direction of a tire belt layer; and
   estimating the conditions of a running tire based on the detected contact lengths.

6. The tire condition estimating method according to claim 5, wherein the contact lengths at linearly symmetrical positions which are equally distant in the axial direction from the center in the tire axial direction of the tire tread portion are detected to estimate lateral force generated by the tire from the ratio of the contact lengths.

7. The tire condition estimating method according to claim 5, wherein the contact lengths at linearly symmetrical positions which are equally distant in the axial direction from the center in the tire axial direction of the tire tread portion are detected to estimate a load applied to the tire from the average value of the contact lengths.

8. The tire condition estimating method according to claim 6, wherein the contact lengths at linearly symmetrical positions which are equally distant in the axial direction from the center in the tire axial direction of the tire tread portion are detected to estimate a load applied to the tire from the average value of the contact lengths, and the lateral force estimated value is corrected by using this load estimated value.

9. The tire condition estimating method according to claim 5, wherein the attitude angle of the tire is estimated from the level ratio of the front half to the latter half of ground contact of the tire input detection value and the ratio of the contact lengths at linearly symmetrical positions which are equally distant in the axial direction from the center in the tire axial direction of the tire tread portion.

10. The tire condition estimating method according to claim 6, wherein the attitude angle of the tire is estimated from the level ratio of the front half to the latter half of ground contact of the tire input detection value and the ratio of the contact lengths at linearly symmetrical positions which are equally distant in the axial direction from the center in the tire axial direction of the tire tread portion, and the lateral force estimated value is corrected by using this attitude angle estimated value.

11. The tire condition estimating method according to claim 5, wherein the contact lengths at linearly symmetrical positions which are equally distant in the axial direction from the center in the tire axial direction of the tire tread portion are detected to estimate whether the tire is approaching the grip limit from a change in the ratio of the contact lengths.

12. The tire condition estimating method according to claim 5, wherein the contact lengths at linearly symmetrical positions which are equally distant in the axial direction from the center in the tire axial direction of the tire tread portion are detected to estimate a friction coefficient between the tire and the road from a change in the ratio of the contact lengths.

13. The tire condition estimating method according to claim 12, wherein the estimated road friction coefficient is corrected based on a slip ratio computed from the wheel speed of a driving wheel and the wheel speed of a driven wheel.

14. A tire condition estimating method comprising the steps of:
   monitoring the ratio of tire input detection values at linearly symmetrical positions which are equally distant in the axial direction from the center in the tire axial direction of the tire tread portion obtained by using a sensor-incorporating tire comprising at least two tire input detection means for detecting an input from the road which acts on a tire tread portion, which are buried in a tread rubber on the outer side in the radial direction of a tire belt layer; and
   estimating that the unsymmetrical wear of the tire proceeds when the ratio exceeds a preset threshold value for a predetermined time or longer.

* * * * *